(12) United States Patent
Ikemoto et al.

(10) Patent No.: US 6,745,796 B2
(45) Date of Patent: Jun. 8, 2004

(54) HYDROGEN FUEL TRANSPORTING HOSE FOR FUEL-CELL POWERED VEHICLE

(75) Inventors: Ayumu Ikemoto, Komaki (JP); Ryo Hirai, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/376,115

(22) Filed: Feb. 28, 2003

(65) Prior Publication Data

US 2003/0178081 A1 Sep. 25, 2003

(30) Foreign Application Priority Data

Mar. 25, 2002 (JP) ........................................ 2002-082602

(51) Int. Cl.[7] ................................................. F16L 11/04
(52) U.S. Cl. ........................ 138/126; 138/137; 138/140; 428/36.91; 428/36.8; 525/331.7
(58) Field of Search ............................... 138/126, 125, 138/137, 141, 140; 428/36.91, 36.8; 525/331.7

(56) References Cited

U.S. PATENT DOCUMENTS

| 5,149,732 A | * | 9/1992 | Igarashi et al. | ............. 524/315 |
| 6,071,582 A | * | 6/2000 | Tangiku et al. | ............. 428/36.91 |
| 6,619,329 B2 | * | 9/2003 | Ikemoto et al. | ............. 138/126 |
| 2003/0050405 A1 | * | 3/2003 | Ikeda et al. | ............. 525/331.7 |
| 2003/0124284 A1 | * | 7/2003 | Ikemoto et al. | ............. 428/36.8 |

FOREIGN PATENT DOCUMENTS

| EP | 0 821 035 A1 | | 1/1998 | |
| EP | 0 870 800 A1 | | 10/1998 | |
| EP | 1 195 244 A1 | | 4/2002 | |
| EP | 1 283 388 A1 | | 2/2003 | |
| EP | 1 287 981 A2 | | 3/2003 | |
| EP | 1291566 A2 | * | 3/2003 | ............. F16L/11/12 |
| FR | 2 781 720 A1 | | 2/2000 | |
| JP | 2002-081581 | | 3/2002 | |

* cited by examiner

Primary Examiner—Patrick Brinson
(74) Attorney, Agent, or Firm—Burr & Brown

(57) ABSTRACT

A hydrogen fuel transporting hose for a fuel cell powered vehicle having a laminar structure includes at least one inner rubber layer, at least one reinforcing layer, and at least one outer rubber layer, which layers are laminated integrally with one another in the order of description in a radially outward direction of the hose. Each of the inner and outer rubber layers are obtained by vulcanizing a rubber composition including a rubber material selected from the group consisting of a halogenated butyl rubber material, and a blend of a halogenated butyl rubber material and a butyl rubber material. The vulcanized rubber includes a filler having a layered crystal structure and is vulcanized with one of a peroxide vulcanizing agent and a resin vulcanizing agent.

12 Claims, 1 Drawing Sheet

HYDROGEN FUEL TRANSPORTING HOSE FOR FUEL-CELL POWERED VEHICLE

CROSS-REFERENCE TO RELATED APPLICATION

The present application claims priority under 35 U.S.C. §119 to Japanese Patent Application No. 2002-082602, filed on Mar. 25, 2002, entitled "Hydrogen fuel transporting hose for fuel-cell powered vehicle." the entirety of which is incorporated herein by reference.

BACKGROUND OF THE INVENTION

1. Field of the Invention

The present invention relates to a rubber hose for transporting a hydrogen fuel used for a fuel-cell powered vehicle. More particularly, the invention is concerned with such a rubber hose used as a conduit or piping for transporting the hydrogen fuel in a fuel-cell powered automotive vehicle as a next-generation vehicle.

2. Discussion of Related Art

In recent years, problems of depletion of the fossil fuel and environmental pollution such as the acid rain, global warming phenomenon, etc., have been getting serious throughout the world. In view of this, a fuel-cell powered vehicle which assures high energy savings and which does not emit harmful exhaust gases has been developed as an alternative for a gasoline or diesel vehicle. As is well known, the fuel-cell powered vehicle is equipped with a fuel cell wherein hydrogen and oxygen (air) electrochemically react with each other, so as to generate electricity with which an electric motor of the vehicle is operated to drive the vehicle.

To the negative electrode of the fuel cell, a hydrogen fuel such as a pure hydrogen gas or hydrogen obtained by reforming a natural gas, methanol, gasoline, etc., is supplied via a piping. As the piping for transporting such a hydrogen fuel, there has been proposed a metal tube formed of a stainless steel, for instance and exhibiting a high degree of hydrogen gas impermeability, by taking into account a fact that the hydrogen is explosive when exposed to a certain environment.

The proposed metal tube, however, has a low degree of flexibility or a high degree of rigidity, undesirably reducing a freedom of piping layout. Since not only dry hydrogen but also wet hydrogen including a steam therein flows through the tube, the metal tube may suffer from corrosion due to the steam.

To overcome the problems described above, there has been a demand for a rubber hose which has high degrees of flexibility and freedom of piping layout and which assures easy installation thereof. While there have been proposed various kinds of rubber hoses such as a refrigerant transporting hose used for an air conditioning system and a gasoline fuel transporting hose, none of the conventionally proposed rubber hoses satisfy, to a sufficient extent, the characteristics required by the hydrogen fuel transporting hose used for the fuel-cell powered vehicle.

SUMMARY OF THE INVENTION

The hydrogen fuel transporting hose is generally required to exhibit high degrees of gas impermeability, in other words, hydrogen gas impermeability, for preventing a leakage flow of the hydrogen fuel through the hose, and corrosion resistance to steam, a high degree of insulation performance, in other words, a high electric resistivity, for preventing a leakage flow of the electric current from the fuel cell as the electric generator, and low ion extractability for substantially preventing ions such as metal ions and sulfur ions from being extracted from the rubber hose into the hydrogen fuel flowing therethrough. It has been desired to develop a rubber hose which satisfies those characteristics to a sufficient extent. If the ions such as the metal ions and the sulfur ions were mixed into the hydrogen fuel flowing through the rubber hose, the hydrogen fuel contaminated with the ions would be supplied to the fuel cell, resulting in contamination of the catalyst and the electrolyte of the fuel cell. In this case, the fuel cell suffers from a reduced efficiency of electricity generation, so that the output of the fuel cell is undesirably lowered.

SUMMARY OF THE INVENTION

It is therefore an object of the invention to provide a rubber hose for transporting a hydrogen fuel hose used for a fuel-cell powered vehicle, which rubber hose has high degrees of flexibility, freedom of piping layout, and hydrogen fuel impermeability, while exhibiting a high electric resistivity and a low ion extractability for substantially preventing ions such as metal ions and sulfur ions harmful to the fuel cell, from being extracted from the rubber hose into the hydrogen fuel flowing therethrough.

The above object of the present invention may be achieved according to a principle of the invention, which provides a hydrogen fuel transporting hose for a fuel cell powered vehicle having a laminar structure including at least one inner rubber layer, at least one reinforcing layer, and at least one outer rubber layer, which layers are laminated integrally with one another in the order of description in a radially outward direction of the hose, wherein the improvement comprises: each of the at least one inner rubber layer and the at least one outer rubber layer being provided by a vulcanized rubber obtained by vulcanizing a rubber composition including: (A) a rubber material selected from the group consisting of (a1) a halogenated butyl rubber material, (a2) a blend of a halogenated butyl rubber material and a butyl rubber material, and (a3) an ethylene-propylene rubber material, and (B) a filler whose crystal structure is a layer structure, the rubber composition being vulcanized with one of a peroxide vulcanizing agent and a resin vulcanizing agent where the rubber composition includes, as the rubber material, one of (a1) the halogenated butyl rubber material and (a2) the blend of the halogenated butyl rubber material and the butyl rubber material, while the rubber composition being vulcanized with the peroxide vulcanizing agent where the rubber composition includes, as the rubber material, (a3) the ethylene-propylene rubber material.

Unlike the conventional metal tubes and the resin tubes formed of the respective materials having certain degrees of rigidity, the present hydrogen fuel transporting hose formed of the rubber material has high degrees of flexibility and freedom of piping layout, and assures easy installation thereof. Further, the hydrogen fuel transporting hose according to the present invention is formed of a rubber material suitably selected from among a halogenated butyl rubber material, a blend of a halogenated butyl rubber material and a butyl rubber material, and an ethylene-propylene rubber material, which rubber materials exhibit excellent characteristics such as high degrees of gas impermeability, resistances to steam and weather, etc. Each of the inner and outer rubber layers of the laminar structure of the hose is provided by a vulcanized rubber obtained by vulcanizing the selected rubber material with a peroxide vulcanizing agent or a resin vulcanizing agent, so that the present rubber hose exhibits high degrees of impermeability of hydrogen gas and steam which are included in the hydrogen fuel. In the present rubber hose wherein the selected rubber material is vulcanized with the peroxide vulcanizing agent or the resin vulcanizing agent, the ions such as the metal ions and the sulfur ions which may cause an undesirable trouble with the fuel cell are not substantially extracted from the hose into the hydrogen fuel flowing therethrough, unlike in an arrangement wherein the rubber material is vulcanized with a sulfur vulcanizing agent, using a vulcanization accelerator such as a metal oxide and a metal hydroxide.

To the vulcanized rubber which gives each of the inner and outer rubber layers, there is added a filler whose crystal structure is a layer structure, i.e., layered crystal structure. (This filler is hereinafter referred to as "layered filler"). Unlike the conventional rubber hose in which only carbon black is included therein as a filler or a reinforcing agent, the present rubber hose wherein the layered filler is included exhibits a significantly high electric resistivity and low ion extractability for substantially preventing the ions such as the metal ions and sulfur ions possibly causing an undesirable trouble with the fuel cell, from being extracted from the hose into the hydrogen fuel flowing therethrough. While the mechanism of the low ion extractability exhibited by the layered filler is not sufficiently clear, it is speculated that the ions such as the metal ions are held by and between the adjacent layers of the layered filler, so as to prevent extraction of the ions from the vulcanized rubber.

In the hydrogen fuel transporting hose according to the present invention, the fiber reinforcing layer formed by spiraling or braiding and commonly provided in ordinary rubber hoses is provided between the inner and outer rubber layers, so that the present hose can sufficiently withstand the pressure of the hydrogen fuel flowing therethrough.

In one preferred form of the present invention, the vulcanized rubber which gives each of the at least one inner rubber layer and the at least one outer rubber layer has an ion extractability represented by an electric conductivity of not greater than 50 $\mu$S/cm at a temperature of 25° C. in an extracted solution of the vulcanized rubber, the extracted solution being obtained by immersing, for 168 hours, 50 g of the vulcanized rubber in 250 ml of pure water kept at 100° C. The present arrangement provides the hydrogen fuel transporting hose which advantageously attains the object of the invention.

In another preferred of the present invention, the halogenated butyl rubber material is a chlorobutyl rubber material or a bromobutyl rubber material.

In still another preferred form of the present invention, the ethylene-propylene rubber material includes a ternary copolymer of ethylene-propylene-diene, a binary copolymer of ethylene-propylene, and a blend of the ternary copolymer of ethylene-propylene-diene and the binary copolymer of ethylene-propylene.

BRIEF DESCRIPTION OF THE DRAWING

The above and other objects, features, advantages and technical and industrial significance of the present invention will be better understood by reading the following detailed description of a presently preferred embodiment of the invention, when considered in connection with the accompanying drawing, in which the single FIGURE is a perspective view of a typical example of a hydrogen fuel transporting hose embodying the present invention.

DETAILED DESCRIPTION OF THE INVENTION

Figure 1:
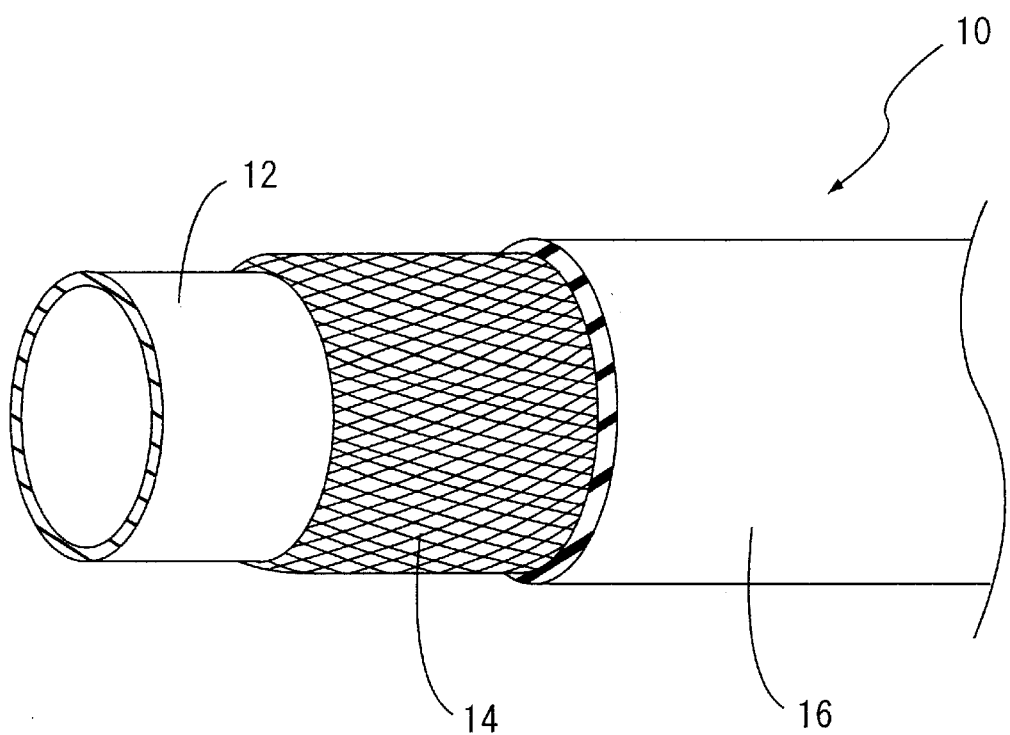

Referring to FIG. 1, there is shown a hydrogen fuel transporting hose 10 used for a fuel-cell powered vehicle, which hose is constructed according to one embodiment of the present invention. The hydrogen fuel transporting hose 10 has a laminar structure consisting of an inner rubber layer 12, a reinforcing layer 14, and an outer rubber layer 16, which layers are laminated integrally with one another in the order of description in a radially outward direction of the hose 10.

In the hydrogen fuel transporting hose 10 constructed as described above, each of the inner rubber layer 12 and the outer rubber layer 16 is formed of a rubber composition which includes, as a rubber material, one of a halogenated butyl rubber material, a blend of a halogenated rubber material and a butyl rubber material, and an ethylene-propylene rubber material. According to this arrangement, the rubber layers each exhibiting an excellent resistance to permeability of the hydrogen gas are provided respectively as the inner and outer rubber layers 12, 14 of the laminar structure of the hose 10.

As the rubber material for each of the inner and outer rubber layers 12, 16 selected from among the halogenated butyl rubber material, the blend of the halogenated butyl rubber material and the butyl rubber material, and the ethylene-propylene rubber material, any known suitable rubber materials may be employed. Examples of the halogenated butyl rubber material include a chlorobutyl rubber material (Cl-IIR material) and a bromobutyl rubber material (Br-IIR material), which are obtained by halogenation of a butyl rubber material (IIR material) that is obtained by copolymerization of isobutylene and a small amount of isoprene. As the blend of the halogenated IIR material and the IIR material, it is preferable to use a mixture which includes the halogenated IIR as the main rubber material, and a small amount of the IIR, for effective vulcanization. Any known ethylene-propylene rubber materials (EPR material) may be used such as a ternary copolymer of ethylene-propylene-diene (EPDM), a binary copolymer of ethylene-propylene (EPM), and a mixture of the EPDM material and the EPM material. Among the halogenated IIR material, the blend of the halogenated IIR material and the IIR material, and the EPR material, it is particularly preferable to employ the halogenated IIR material as the rubber material for the inner and outer rubber layers 12, 16, since the halogenated IIR material exhibits excellent hydrogen gas impermeability.

There are known various EPDM materials including different kinds of a diene monomer as the third component other than ethylene and propylene. While the diene monomer which is included in the EPDM material used in the present invention is not particularly limited, it is preferable to employ an EPDM material in which the diene monomer having 5–20 carbon atoms is included. Examples of the diene monomer include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCPD), 5-ethylidene-2-norbornene (ENB), 5-butylidene-2-norbornene, 2-methallyl-5-norbornene, and 2-isopropenyl-5-norbornene. Any one of or any combination of those diene monomers may be employed as the third component of the EPDM material. In the present invention, it is particularly preferable to employ an EPDM material in which at least one of the DCPD and ENB is included as the third component.

The rubber composition for forming each of the inner and outer rubber layers 12, 16, which includes as the rubber material a suitably selected one of the halogenated IIR material, the blend of the halogenated IIR material and the IIR material, and the EPR material, further includes a filler whose crystal structure is a layer structure (layered filler). Owing to the inclusion of the layered filler in the rubber composition, the inner and outer rubber layers 12, 16 have a significantly improved electric resistivity. Moreover, the layered filler is effective to prevent ions such as sulfur ions and metal ions possibly causing an undesirable trouble with the fuel cell, from being extracted or released from the inner rubber layer 12 into the hydrogen fuel, or from the outer rubber layer 16 into the hydrogen fuel via the inner rubber layer 12. Thus, the present hose exhibits a low ion extractability owing to the inclusion of the layered filler in the rubber composition for each of the inner and outer rubber layers 12, 16. As described above, it is speculated that the ions are held by and between the adjacent layers of the layered filler, so that the ions are not likely to be extracted or released from the vulcanized rubber giving each of the inner and outer rubber layers 12, 16.

Examples of the layered filler include clay, talc, kaolinite, hydrotalcite, and mica. Any one of or any combination of those fillers may be suitably employed. The layered filler preferably has an average particle size in a range of 0.05–20 $\mu$m, more preferably in a range of 0.1–10 $\mu$m, for permitting the inner and outer rubber layers 12, 16 to exhibit good mechanical properties or characteristics and a high degree of workability.

The layered filler is preferably added in an amount of 20–130 parts by weight, more preferably in an amount of 40–110 parts by weight, per 100 parts weight of the suitably selected rubber material. If the amount of the layered filler is excessively small, the electric resistivity of the inner and outer rubber layers 12, 16 undesirably decreases, making it difficult to obtain the desired rubber hose. On the other hand, the use of an excessively large amount of the layered filler not only pushes up the cost of manufacture of the hose, but also inhibits the effect of lowering the ion extractability exhibited by the layered filler, since the layered filler used in the excessively large amount is not uniformly dispersed in the vulcanized rubber giving each of the inner and outer rubber layers 12, 16. In this case, the ions are likely to be extracted from the inner and outer rubber layers 12, 16 of the hose into the hydrogen fuel flowing through the hose, undesirably contaminating the hydrogen fuel.

To the rubber composition in which the suitably selected rubber material and the layered filler are included, there is added a vulcanizing agent for vulcanizing the rubber material. The thus prepared unvulcanized rubber composition for each of the inner and outer rubber layers 12, 16 is formed and vulcanized into each of the inner and outer rubber layers 12, 16 having respective predetermined thickness values. The vulcanizing agent added to the unvulcanized rubber composition for vulcanizing the rubber material is selected from peroxide vulcanizing agents and resin vulcanizing agents.

Examples of the peroxide vulcanizing agent include organic peroxides such as 2,4-dichlorobenzoyl peroxide, benzoyl peroxide, 1,1-di-t-butylperoxy-3,3,5-trimethylcyclohexane, 2,5-dimethyl-2,5-dibenzoylperoxyhexane, n-butyl-4,4'-di-t-butylperoxyvalerate, dicumyl peroxide, t-butylperoxybenzoate, di-t-butylperoxy-diisopropylbenzene, t-butylcumyl peroxide, 2,5-dimethyl-2,5-di-t-butylperoxyhexane, di-t-butyl peroxide, and 2,5-dimethyl-2,5-di-t-butylperoxyhexyne-3. As the resin vulcanizing agent, alkylphenol resin or modified alkylphenol resin is used, for instance.

The peroxide vulcanizing agent is generally used in an amount of 1–10 parts by weight, preferably 3–7 parts by weight, per 100 parts by weight of the selected rubber material, while the resin vulcanizing agent is generally used in an amount of 1–20 parts by weight, preferably 3–18 parts by weight, per 100 parts by weight of the selected rubber material. If the amount of the vulcanizing agent is excessively small, the unvulcanized rubber composition cannot be sufficiently vulcanized, deteriorating the sealing characteristics required by the hose. On the other hand, the use of the vulcanizing agent in an excessively large amount undesirably hardens the produced hose, so that the hose suffers from a decrease in its breaking elongation and an increase in its permanent compressive strain, failing to exhibit the physical properties or characteristics required by the hose.

The vulcanizing agent to be used, in other words, the vulcanizing system for vulcanizing the unvulcanized rubber composition, is suitably determined depending upon the kind of the selected rubber material, the intended properties of the hose to be obtained, etc. Where the rubber composition includes, as the rubber material, one of the halogenated IIR material and the blend of the halogenated IIR material and the IIR, material, the rubber composition is vulcanized with one of the peroxide vulcanizing agent and the resin vulcanizing agent. Accordingly, a suitable one of the peroxide vulcanization system and the resin vulcanization system, in other words, a suitable one of the peroxide vulcanizing agent and the resin vulcanizing agent is employed, depending upon the characteristics required by the hose. For permitting the hose to exhibit a lower degree of ion extractability, it is preferable to use the peroxide vulcanizing agent. When the unvulcanized rubber composition includes the EPR material as the rubber material, the rubber composition is vulcanized with the peroxide vulcanizing agent.

By employing the peroxide vulcanization system or the resin vulcanization system for vulcanizing the unvulcanized rubber composition, it is not necessary to add a sulfur vulcanizing agent and a vulcanization accelerator such as a metal oxide or a metal hydroxide conventionally used in the sulfur vulcanization system. This arrangement significantly reduces absolute amounts of components contained in the inner and outer rubber layers 12, 16, which components may release or emit ions, whereby the amount of the ions extracted or released from the inner and outer rubber layers 12, 16 into the hydrogen fuel can be significantly reduced.

To the rubber composition described above, various known additives may be added as needed, for permitting the rubber hose to exhibit the mechanical properties and the hardness required by the rubber hose. Such additives include a reinforcing agent such as carbon black, a softener, a co-crosslinking agent or coagent, an antioxidant, a tackifier, a lubricant, a dispersing agent, a processing aid, etc. Needless to say, these additives should not prevent the produced rubber hose from exhibiting the desired characteristics such as the low ion extractability, and the amounts of the additives should be determined so as not to deteriorate the characteristics.

The above-described layered filler, the vulcanizing agent, and the suitable additives are added to the selected rubber material according to the present invention. The obtained mixture is kneaded by a suitable known kneader or mixer, for instance, by a kneader called "Bunbury's mixer", or a mixer of roll type, so as to provide the unvulcanized rubber composition for forming each of the intended inner or outer rubber layer 12, 16.

The reinforcing layer 14 may be a fiber reinforcing layer as commonly used as a reinforcing layer in ordinary rubber hoses, so as to withstand the pressure of the hydrogen fuel flowing through the hose. For example, the reinforcing layer 14 is formed by spiraling or braiding a known reinforcing thread such as a rayon thread, a polyester thread or a polyamide thread. The reinforcing layer 14 as the fiber reinforcing layer is laminated on the outer circumferential surface of the inner rubber layer 12.

On the outer circumferential surface of the reinforcing layer 14 which is formed on the outer circumferential surface of the inner rubber layer 12, the outer rubber layer 16 is formed by using the above-described rubber composition. The rubber composition for the outer rubber layer 16 may be the same as, or different from the rubber composition for the inner rubber layer 12. For instance, both of the inner and outer rubber layers 12, 16 may be formed of a rubber composition in which the halogenated IIR material and the organic peroxide are included. Alternatively, the inner rubber layer 12 may be formed of the rubber composition in which the halogenated IIR material and the organic peroxide are included, while the outer rubber layer 16 may be formed of a rubber composition in which the EPR material and the organic peroxide are included. The rubber composition for each of the inner and outer rubber layers 12, 16 is suitably determined depending upon the desired rubber specifications and the cost of manufacture of the rubber hose.

In the present hydrogen fuel transporting hose 10 having the laminar structure consisting of the inner rubber layer 12, the reinforcing layer 14, and the outer rubber layer 16, the outer rubber layer 16 is also provided by a vulcanized rubber exhibiting a low ion extractability, which is similar to the vulcanized rubber that gives the inner rubber layer 12. Accordingly, the ions which may cause an undesirable trouble with the fuel cell are effectively prevented from being extracted from the outer rubber layer 16 into the hydrogen fuel via the reinforcing layer 14 and the inner rubber layer 12. Thus, unlike the conventional rubber hose, the present hydrogen fuel transporting hose 10 advantageously exhibits a low ion extractability, a high degree of resistance to permeation of the hydrogen fuel therethrough, and a high degree of electric resistivity.

The dimensions of the hydrogen fuel transporting hose 10 constructed according to the present invention are not particularly limited. In general, the fuel hose 10 has an outside diameter of about 8–50 mm and a thickness value (i.e., the wall thickness of the hose 10) of about 1.8–6 mm. The thickness values of the individual layers of the hose 10 are suitably determined so as to permit the layers to exhibit the respectively intended functions. In general, the inner rubber layer 12 has a thickness value of about 1–4 mm while the outer rubber layer 16 has a thickness value of about 0.8–2 mm.

The present hydrogen fuel transporting hose 10 is manufactured by a known method commonly used for forming ordinary rubber hoses. For example, the inner rubber layer 12, the reinforcing layer 14 and the outer rubber layer 16 are laminated on one another on a mandrel, and the thus obtained laminar tubular structure is vulcanized into an integral tubular structure. Subsequently, the mandrel is removed from the vulcanized integral tubular structure, so that the desired hose is fabricated.

The thus constructed hydrogen fuel transporting hose 10 as the rubber hose has high degrees of flexibility and freedom of piping layout, and assures easy installation thereof. Each of the inner and outer rubber layers 12, 16 of the hose 10 is formed by vulcanization of the rubber composition, using the peroxide vulcanizing agent or the resin vulcanizing agent, which rubber composition includes, as the rubber material, one of the halogenated IIR material, the blend of the halogenated IIR material and the IIR material, and the EPR material, and the layered filler. The thus constructed hose 10 exhibits excellent hydrogen fuel impermeability. Further, the present hose 10 wherein the amount of the carbon black to be added can be minimized is given a higher degree of electric resistivity than the conventional rubber hose wherein only carbon black is added as the filler or reinforcing agent.

In producing the present rubber hose 10 which is formed by using the peroxide vulcanizing agent or the resin vulcanizing agent, it is not necessary to add sulfur, metal oxides, and metal hydroxides, which may release or emit the ions such as metal ions and sulfur ions possibly causing an undesirable trouble with the fuel cell. Accordingly, such ions are not substantially extracted or released from the hose into the hydrogen fuel, especially into the steam included in the hydrogen fuel flowing through the hose. Described more specifically, the vulcanized rubber that gives each of the inner and outer rubber layers 12, 16 of the present hose 10 has an ion extractability represented by an electric conductivity of not greater than 50 $\mu$S/cm at a temperature of 25° C. in an extracted solution of the vulcanized rubber, which extracted solution is obtained by immersing, for 168 hours, 50 g of the vulcanized rubber in 250 ml of pure water kept at 100° C.

The thus constructed hydrogen fuel transporting hose 10 is advantageously installed on the fuel-cell powered vehicle, for preventing a leakage flow of electric current from the fuel cell as the electric generator, so as to effectively protect the vehicle drivers and passengers from an electrical shock, and maintaining the electricity generation efficiency of the fuel cell at desired high levels.

The construction of the hydrogen fuel transporting hose according to the present invention is not limited to that shown in FIG. 1, but may be otherwise modified. For instance, the hose may include two or more of the inner rubber layers 12, reinforcing layers 14 and outer rubber layers 16. Where the hose includes two or more reinforcing layers 14, a suitable rubber layer may be provided between adjacent two reinforcing layers 14, 14. Further, an intermediate rubber layer may be provided between the inner rubber layer 12 and the reinforcing layer 14.

EXAMPLES

To further clarify the present invention, some examples of the present invention will be described. It is to be understood that the present invention is not limited to the details of these examples, but may be embodied with various changes, modifications and improvements, other than the following examples and the details of the foregoing descriptions, which may occur to those skilled in the art, without departing from the spirit of the invention defined in the attached claims.

Initially, there were prepared various unvulcanized rubber compositions, i.e., Samples 1–3 according to the present invention and Comparative Samples 1–3, as indicated in TABLE 1 and TABLE 2 below. Described in detail, in preparing the respective rubber compositions, there were used, as the rubber material, a Cl-IIR material ("JSR-HT1066" available from JSR CORPORATION, Japan), an EPDM material ("ESPRENE 532" available from SUMITOMO CHEMICAL CO., LTD., Japan), and an NBR material ("JSR N230S" available from JSR CORPORATION, Japan). As the filler, talc ("MISTRON PAPER TALC"

available from NIPPON MISTRON KABUSHIKI KAISHA, Japan) was used. As the vulcanizing agent, a peroxide vulcanizing agent ("PERBUTYL P-40" available from NOF CORPORATION, Japan), a resin vulcanizing agent ("TACKIROLL 201" available from TAOKA CHEMICAL CO., LTD., Japan), and sulfur ("SULFUR-PTC" available from DAITO SANGYO KABUSHIKI KAISHA, Japan) were used. As the softener, a paraffin softener ("DIANAPROCESS PW-380" available from IDEMITSU KOSAN KABUSHIKI KAISHA, Japan) and a phthalate softener ("DOP" available from MITSUBISHI MONSANTO KASEI VINYL KABUSHIKI KAISHA, Japan) were used. As the reinforcing agent, carbon black ("ASAHI #52" available from ASAHI CARBON KABUSHIKI KAISHA, Japan) was used. Where the peroxide vulcanization system is employed, a co-crosslinking agent or coagent ("HICROSS M-P" available from SEIKO CHEMICAL CO., LTD., Japan) is used. Where the sulfur vulcanization system is employed, a vulcanization accelerator ("SUNSELLER TT" available from SANSHIN CHEMICAL CO., LTD., Japan) was used. As needed, a vulcanization accelerator activator ("ZINC OXIDE II" available from MITSUI MINING & SMELTING CO., Ltd., Japan) was used in the sulfur vulcanization system.

The thus prepared unvulcanized rubber compositions, i.e., Samples 1–3 according to the present invention and Comparative Samples 1–3, were subjected to a press-molding and -vulcanizing process at 160° C. for 45 minutes, so as to provide respective vulcanized rubbers on which the following tests were performed to evaluate the properties of the vulcanized rubbers. Described in detail, each vulcanized rubber was subjected to a test for examining the hydrogen permeability, a test for examining the ion extractability, and a test for examining the electric resistivity, in the following manner. The results of the tests are also indicated in TABLE 1 and TABLE 2 below.

<Hydrogen Permeability>

To evaluate the hydrogen permeability of each of the vulcanized rubbers, there was used a gas-permeability measuring device of differential pressure type which employs ASTM D-1434-75M (available from YANACO BUNSEKI KOGYO KABUSHIKI KAISHA, Japan). In this test, a sheet-like member formed of each vulcanized rubber and having a diameter of 60 mm and a thickness of 2 mm was used. Each of the sheet-like vulcanized rubbers was pressurized by the hydrogen gas at 80° C., and was measured of its gas permeability coefficient per unit thickness ($\times 10^{-9}$ cm$^3$•cm/cm$^2$•sec•cmHg).

<Ion Extractability>

In the following test for examining the ion extractability, a sheet-like member formed of each vulcanized rubber and having a thickness of 2 mm was used. After each of the sheet-like vulcanized rubbers had been degreased with alcohol, a measured 50 g of each of the sheet-like vulcanized rubbers was accommodated into an air-tightly sealed vessel formed of polytetrafluoroethylene. Subsequently, 250 ml of pure water was put into the vessel, and the vessel was heated at 100° C. for 168 hours, so as to provide an extracted solution of each vulcanized rubber. After the sealed vessel had been cooled down to room temperature (25° C.), the extracted solution of each vulcanized rubber was measured of its electric conductivity at room temperature (25° C.) by using an electric conductivity meter. The amounts of ions such as sulfur ions and metal ions extracted or released into the pure water decrease with a decrease of the measured electric conductivity.

<Electric Resistivity>

In the following test for evaluating the electric resistivity of each of the vulcanized rubbers, a sheet-like member formed of each vulcanized rubber and having a thickness of 2 mm was used. The sheet-like vulcanized rubber is punched into a circular member having a diameter of 100 mm, and was measured of its volume resistivity at an applied voltage of 100V, according to JIS-K-6911, "Resistivity Test Method".

TABLE 1

| | | Samples of the Invention | | |
|---|---|---|---|---|
| | | 1 | 2 | 3 |
| Contents (part by weight) | | | | |
| rubber | Cl-IIR | 100 | 100 | — |
| | EPDM | — | — | 100 |
| vulcanization sytem | peroxide vulcanizing agent | 4.2 | — | 4.2 |
| | resin vulcanizing agent | — | 9 | — |
| | co-crosslinking agent | 2 | — | 2 |
| filler | Talc | 70 | 70 | 75 |
| carbon black | | 50 | 50 | 100 |
| softener | paraffin softener | 5 | 5 | 60 |
| Characteristics | | | | |
| hydrogen gas permeability (gas permeability coefficient) [10$^{-9}$ · cm$^3$ · cm/cm$^2$ · sec · cmHg] | | 6 | 5.4 | 11 |
| ion extractability (electric conductivity) [µS/cm] | | 15 | 19.8 | 14.8 |
| electric resistivity (volume resistivity) [Ω · cm] | | 5 × 10$^{12}$ | 5 × 10$^{12}$ | 4 × 10$^{11}$ |

TABLE 2

| | | Comparative Samples | | |
|---|---|---|---|---|
| | | 1 | 2 | 3 |
| Contents (part by weight) | | | | |
| rubber | Cl-IIR | 100 | — | — |
| | EPDM | — | 100 | — |
| | NBR | — | — | 100 |
| vulcanization system | Sulfur | 1 | 1 | 1 |
| | Vulcanization accelerator TT | 4 | 4 | 2 |
| | zinc ozide | — | — | 5 |
| filler | Talc | 70 | 75 | — |
| carbon black | | 50 | 100 | 60 |
| softener | paraffin softener | 5 | 60 | — |
| | phthalate softener | — | — | 10 |
| Characteristics | | | | |
| hydrogen gas permeability (gas permeability coefficient) [10$^{-9}$ · cm$^3$ · cm/cm$^2$ · sec · cmHg] | | 5.8 | 11 | 7.2 |
| ion extractability (electric conductivity) [µS/cm] | | 800 | 820 | 770 |
| electric resistivity (volume resistivity) [Ω · cm] | | 2 × 10$^{11}$ | 6 × 10$^9$ | 4 × 10$^8$ |

As is apparent from the results indicated in the above TABLE 1 and TABLE 2, in the vulcanized rubber (according to Sample 1) obtained by vulcanization of the Cl-IIR material using the peroxide vulcanizing agent, the vulcanized rubber (according to Sample 2) obtained by vulcanization of the Cl-IIR material using the resin vulcanizing agent, and the vulcanized rubber (according to Sample 3) obtained by vulcanization of the EPDM material using the peroxide vulcanizing agent, the gas permeability values were relatively small, so that these vulcanized rubbers have excellent hydrogen gas impermeability. Further, the volume resistivity values were larger than $10^{11}$ Ω·cm in those vulcanized rubbers, so that the vulcanized rubbers according to the present invention are given high electric resistivity. In these vulcanized rubbers of the present invention, the electric conductivity values measured in the respective extracted solutions were smaller than 20 μS/cm, so that the vulcanized rubbers according to the present invention exhibits a low ion extractability.

In contrast, while the gas permeability values were relatively small in the vulcanized rubbers (Comparative Samples 1–3) obtained by vulcanization of the Cl-IIR material, the EPDM material, and the NBR material, respectively, using the sulfur vulcanizing agent, the electric conductivity values measured in the respective extracted solutions were several tens or more times larger than those in the vulcanized rubbers according to the present invention. Thus, the vulcanized rubbers according to Comparative Samples 1–3 are inferior in the ion extractability to the vulcanized rubbers according to the present invention.

As is apparent from the results of evaluation of the vulcanized rubbers described above, the rubber hose formed according to known methods by using any one of the rubber compositions according to Samples 1–3 for providing its inner and outer rubber layers is capable of effectively exhibiting high degrees of hydrogen fuel impermeability and electric resistivity, and a low ion extractability.

What is claimed is:

1. A hydrogen fuel transporting hose for a fuel cell powered vehicle having a laminar structure including at least one inner rubber layer, at least one reinforcing layer, and at least one outer rubber layer, which layers are laminated integrally with one another in the order of description in a radially outward direction of the hose, wherein the improvement comprises:

each of the at least one inner rubber layer and the at least one outer rubber layer being a vulcanized rubber material selected from the group consisting of (i) a halogenated butyl rubber material, and (ii) a blend of a halogenated butyl rubber material and a butyl rubber material, said vulcanized rubber including a filler having a layered crystal structure and is vulcanized with one of a peroxide vulcanizing agent and a resin vulcanizing agent.

2. A hydrogen fuel transporting hose according to claim 1, wherein the vulcanized rubber which gives each of the at least one inner rubber layer and the at least one outer rubber layer has an ion extractability represented by an electric conductivity of not greater than 50 μS/cm at a temperature of 25° C. in an extracted solution of the vulcanized rubber, the extracted solution being obtained by immersing, for 168 hours, 50 g of the vulcanized rubber in 250 ml of pure water kept at 100° C.

3. A hydrogen fuel transporting hose according to claim 1, wherein the halogenated butyl rubber material is a chlorobutyl rubber material or a bromobutyl rubber material.

4. A hydrogen fuel transporting hose according to claim 1, wherein the filler is selected from the group consisting of clay, talc, kaolinite, and hydrotalcite.

5. A hydrogen fuel transporting hose according to claim 1, wherein the filler is included in an amount of 20–130 parts by weight per 100 parts by weight of the rubber material.

6. A hydrogen fuel transporting hose according to claim 1, wherein the filler is included in an amount of 40–110 parts by weight per 100 parts by weight of the rubber material.

7. A hydrogen fuel transporting hose according to claim 1, wherein the filler has an avenge particle size of 0.05–20 μm.

8. A hydrogen fuel transporting hose according to claim 1, wherein the filler has an average particle size of 0.1–10 μm.

9. A hydrogen fuel transporting hose according to claim 1, wherein the peroxide vulcanizing agent is used in an amount of 1–10 parts by weight per 100 parts by weight of the rubber material.

10. A hydrogen fuel transporting hose according to claim 1, wherein the peroxide vulcanizing agent is used in an amount of 3–7 parts by weight per 100 parts by weight of the rubber material.

11. A hydrogen fuel transporting hose according to claim 1, wherein the resin vulcanizing agent is used in an amount of 1–20 parts by weight per 100 parts by weight of the rubber material.

12. A hydrogen fuel transporting hose according to claim 1, wherein the resin vulcanizing agent is used in an amount of 3–18 parts by weight per 100 parts by weight of the rubber material.

* * * * *